US012187579B2

(12) United States Patent
Huang et al.

(10) Patent No.: US 12,187,579 B2
(45) Date of Patent: Jan. 7, 2025

(54) SYSTEM AND METHOD FOR ADJUSTABLY POSITIONING OF ELEVATOR GUIDE RAIL

(71) Applicant: Otis Elevator Company, Farmington, CT (US)

(72) Inventors: Gang Huang, Shanghai (CN); Xiaodong Shang, Shanghai (CN); Shenhong Wang, Shanghai (CN); Jianfeng Wu, Shanghai (CN)

(73) Assignee: OTIS ELEVATOR COMPANY, Farmington, CT (US)

(*) Notice: Subject to any disclaimer, the term of this patent is extended or adjusted under 35 U.S.C. 154(b) by 0 days.

(21) Appl. No.: 17/828,807

(22) Filed: May 31, 2022

(65) Prior Publication Data

US 2023/0112950 A1 Apr. 13, 2023

(30) Foreign Application Priority Data

Sep. 24, 2021 (CN) ......................... 202111121110.X

(51) Int. Cl.
*B66B 19/00* (2006.01)
*B66B 7/02* (2006.01)

(52) U.S. Cl.
CPC ............ *B66B 19/002* (2013.01); *B66B 7/027* (2013.01)

(58) Field of Classification Search
CPC ....... B66B 19/002; B66B 7/027; B66B 7/023; B66B 7/02
See application file for complete search history.

(56) References Cited

U.S. PATENT DOCUMENTS 9,751,728 B2 * 9/2017 Mertala ................... E04G 3/246
11,365,095 B2 * 6/2022 Haag ....................... B66B 7/024
2010/0133048 A1 * 6/2010 Barneman ............... B66B 19/00 187/414

FOREIGN PATENT DOCUMENTS

CN 110304518 A * 10/2019 ........... B66B 19/002
EP 3858778 A1 8/2021
JP H05105362 A * 4/1993
JP H08245116 A * 9/1996 ........... B66B 19/002

(Continued)

OTHER PUBLICATIONS

European Search Report for Applicatin No. 22197564.2, Issued Feb. 16, 2023; 7 Pages.

*Primary Examiner* — Michael R Mansen
*Assistant Examiner* — Michelle M Mudwilder
(74) *Attorney, Agent, or Firm* — CANTOR COLBURN LLP

(57) ABSTRACT

A system and method for adjustably positioning elevator guide rail. The system includes: an adjustment device arranged on a moving platform and having a clamping portion and a powering portion, the clamping portion being arranged to be capable of clamping an elevator guide rail to be installed through a power output from the powering portion and moving in a first, a second and/or a third directions, and the moving platform being capable of moving up and down in the first direction; a detection device arranged to detect current movement characteristics of the clamping portion when the elevator guide rail is not clamped or has been clamped by the clamping portion; and a control device connected to the detection device and the adjustment device, and arranged to adjust the position of the clamping portion in place by controlling the powering portion according to the movement characteristics.

18 Claims, 4 Drawing Sheets

(56) References Cited

FOREIGN PATENT DOCUMENTS

| | | | | | |
|---|---|---|---|---|---|
| JP | 2000026042 | A | * | 1/2000 | |
| JP | 2019163154 | A | | 9/2019 | |
| JP | 6910981 | B2 | * | 7/2021 | ........... B66B 19/002 |
| WO | WO-2021192776 | A1 | * | 9/2021 | |

* cited by examiner

SYSTEM AND METHOD FOR ADJUSTABLY POSITIONING OF ELEVATOR GUIDE RAIL

FOREIGN PRIORITY

This application claims priority to Chinese Patent Application No. 202111121110.X, filed Sep. 24, 2021, and all the benefits accruing therefrom under 35 U.S.C. § 119, the contents of which in its entirety are herein incorporated by reference.

TECHNICAL FIELD

The present disclosure relates to the technical field of elevators, in particular to a system and method for adjustably positioning elevator guide rail.

BACKGROUND

Elevator guide rails are usually required to be provided inside elevator hoistways of various elevator systems. Most elevator guide rails are made of rigid metal materials such as steel and aluminum alloy, and they are installed and fixed to an inner wall of the elevator hoistway through brackets, bolts, etc. They can be used to provide guidance for an elevator car, a counterweight and the like which are moving up and down in the elevator hoistway, and can also provide support for a safety caliper when the safety caliper is braking.

At present, generally, on-site installation of the elevator guide rails is directly completed by manual labor effort. Installers will install and fix various elevator guide rail sections having a corresponding total length to the inner wall of the elevator hoistway in sequence along the elevator hoistway according to an actual height of the elevator hoistway. The above traditional installation method particularly relies on the individual technical levels of the installers, and is defective in terms of guide rail installation accuracy, working efficiency, cost investment, and ensuring comfort and safety of the elevator. In addition, although some technical means have been provided in the prior art to improve the on-site installation operations of the elevator guide rails, they still have shortcomings in terms of device structure, reliability and convenience of use, installation accuracy and efficiency, cost, etc.

SUMMARY

In view of the foregoing, the present disclosure provides a system and method for adjustably positioning elevator guide rail, so as to solve or at least alleviate one or more of the above problems and other problems.

First, according to an aspect of the present disclosure, a system for adjustably positioning elevator guide rail is provided, which includes:

an adjustment device arranged on a moving platform and having a clamping portion and a powering portion, the clamping portion being arranged to be capable of clamping an elevator guide rail to be installed through a power output from the powering portion and moving in a first direction, a second direction and/or a third direction, and the moving platform being capable of moving up and down in the first direction; a detection device arranged to detect current movement characteristics of the clamping portion when the elevator guide rail is not clamped or has been clamped by the clamping portion; and a control device connected to the detection device and the adjustment device, and arranged to adjust the position of the clamping portion in place by controlling the powering portion according to the movement characteristics so that the clamped elevator guide rail can be positioned and installed at a target position.

In the system for adjustably positioning elevator guide rail according to the present disclosure, optionally, the system for adjustably positioning elevator guide rail further includes a support device, which is installed on the moving platform and connected to the adjustment device so that the adjustment device is arranged on the moving platform, and which is arranged to abut against at least one side of an elevator hoistway along the second direction at an installation area of the elevator guide rail.

In the system for adjustably positioning elevator guide rail according to the present disclosure, optionally, the support device includes at least one bracket, and the support device is installed on the moving platform through the bracket.

In the system for adjustably positioning elevator guide rail according to the present disclosure, optionally, the bracket has an assembly portion arranged to be detachably installed on the moving platform.

In the system for adjustably positioning elevator guide rail according to the present disclosure, optionally, the support device includes: a body; one or more moving portions connected to the body and arranged on at least one side of the body; and an actuation portion arranged to enable at least a part of the moving portions to move relative to the body in the second direction, so as to adjust a length of the support device in the second direction and make the support device abut against at least one side of the elevator hoistway.

In the system for adjustably positioning elevator guide rail according to the present disclosure, optionally, the support device includes two moving portions, which are symmetrically arranged on both sides of the body.

In the system for adjustably positioning elevator guide rail according to the present disclosure, optionally, the actuation portion includes a driving member installed on the moving portions to provide power to the moving portions.

In the system for adjustably positioning elevator guide rail according to the present disclosure, optionally, the support device and the adjustment device are both arranged substantially along the second direction.

In the system for adjustably positioning elevator guide rail according to the present disclosure, optionally, the adjustment device includes a body and one or more moving portions, the moving portions are connected to the body and arranged on at least one side of the body, and the clamping portion is connected to the moving portions.

In the system for adjustably positioning elevator guide rail according to the present disclosure, optionally, the adjustment device includes two moving portions, which are symmetrically arranged on both sides of the body.

In the system for adjustably positioning elevator guide rail according to the present disclosure, optionally, the powering portion includes a first driving member installed on the moving portions to provide power to the moving portions, and a second driving member installed on the clamping portion to provide power to the clamping portion.

In the system for adjustably positioning elevator guide rail according to the present disclosure, optionally, the system for adjustably positioning elevator guide rail further includes a connection device arranged between the support device and the system for adjustably positioning elevator guide rail to enable the adjustment device to move relative to the support device in the first direction and/or the third direction.

In the system for adjustably positioning elevator guide rail according to the present disclosure, optionally, the detection device includes at least one position sensor, and the movement characteristics include positions of the clamping portion in the first direction, the second direction and/or the third direction detected by the position sensor.

In the system for adjustably positioning elevator guide rail according to the present disclosure, optionally, the position sensor is arranged on the adjustment device and/or the clamped elevator guide rail, data of the positions includes distances between the clamping portion and a reference located in the elevator hoistway in the first direction, the second direction and/or the third direction, and the control device is arranged to control the powering portion to adjust the position of the clamping portion in place by comparing the distances with corresponding distances between the detected target position and the reference in the first direction, the second direction and/or the third direction.

In the system for adjustably positioning elevator guide rail according to the present disclosure, optionally, the reference includes a reference line arranged in the elevator hoistway.

In the system for adjustably positioning elevator guide rail according to the present disclosure, optionally, the control device is connected to the detection device and/or the adjustment device in a wireless manner, and the control device includes a mobile terminal.

In the system for adjustably positioning elevator guide rail according to the present disclosure, optionally, the system for adjustably positioning elevator guide rail further includes a display device connected to the control device and arranged to display data related to the movement characteristics and/or provide human-computer interaction operations which include inputting or modifying data related to the target position.

In the system for adjustably positioning elevator guide rail according to the present disclosure, optionally, the moving platform is an elevator car, and the system for adjustably positioning elevator guide rail is detachably installed on a top frame of the elevator car.

Second, according to another aspect of the present disclosure, a method for installing and adjusting elevator guide rail is also provided, which includes the steps of: arranging the system for adjustably positioning elevator guide rail as described in any one of the above items on a moving platform, and making the moving platform run to an installation area of the elevator guide rail; using the detection device to detect current movement characteristics of the clamping portion when the elevator guide rail is not clamped or has been clamped by the clamping portion; and adjusting the position of the clamping portion in place by controlling the powering portion of the adjustment device using the control device according to the detected movement characteristics so that the clamped elevator guide rail can be positioned and installed at a target position.

In the method for installing and adjusting elevator guide rail according to the present disclosure, optionally, the method further includes the following step: abutting the support device against at least one side of the elevator hoistway along the second direction at the installation area when the system for adjustably positioning elevator guide rail is provided with the support device, before using the detection device for detection.

From the following detailed description combined with the accompanying drawings, the principles, characteristics, features, advantages and the like of the technical solutions according to the present disclosure will be clearly understood. The system of the present disclosure has the advantages of simple structure, easy manufacture and disassembly operations, high use effect, etc. It can be arranged in the elevator hoistway very quickly and conveniently to automatically complete operations such as adjustment, positioning and alignment of the elevator guide rail on site, which is advantageous for achieving the efficiency and quality of elevator guide rail installation, and further promotes effective improvements of elevator running quality, safety performance, etc., thus being helpful for guaranteeing the safety of passengers and devices.

BRIEF DESCRIPTION OF THE DRAWINGS

The technical solutions of the present disclosure will be described in further detail below with reference to the accompanying drawings and embodiments. However, it should be understood that these drawings are designed merely for the purpose of explanation and only intended to conceptually illustrate the structural configurations described herein, and are not required to be drawn to scale.

DETAILED DESCRIPTION

First, it should be noted that the structures, components, characteristics, advantages and the like of the system and method for adjustably positioning elevator guide rail according to the present disclosure will be described below by way of example. However, it should be understood that neither of the descriptions should be understood as limiting the present disclosure in any way. In this document, technical terms "first" and "second" are only used for distinguishing purposes and are not intended to indicate their order and relative importance. The technical term "connect (or connected, etc.)" covers a situation in which a specific component is directly connected to another component and/or indirectly connected to another component. The above situation is also applicable to technical terms such as "abut" and "support". The technical term "first direction" corresponds to a vertical/perpendicular direction of the elevator hoistway, and the technical terms "second direction" and "third direction" correspond to one and the other of a horizontal length direction and a horizontal width direction of the elevator hoistway respectively. The above three directions are perpendicular to each other; for ease of description, an exemplary description will be given below in which the "first direction", "second direction" and "third direction" respectively correspond to the vertical/perpendicular direction, the horizontal length direction and the horizontal width direction of the elevator hoistway.

In addition, for any single technical feature described or implied in the embodiments mentioned herein or any single technical feature shown or implied in individual drawings, the present disclosure still allows for any combination or deletion of these technical features (or equivalents thereof) without any technical obstacle. Therefore, it should be considered that these more embodiments according to the present disclosure are also within the scope recorded in this document. In addition, for the sake of brevity, the same or similar parts and features may only be marked in one or several places in the same drawing, and general items commonly known to those skilled in the art, such as the structural arrangement of existing elevators, the working principles and use of existing detection elements such as various sensors, will not be described in greater detail herein.

Figure 1:
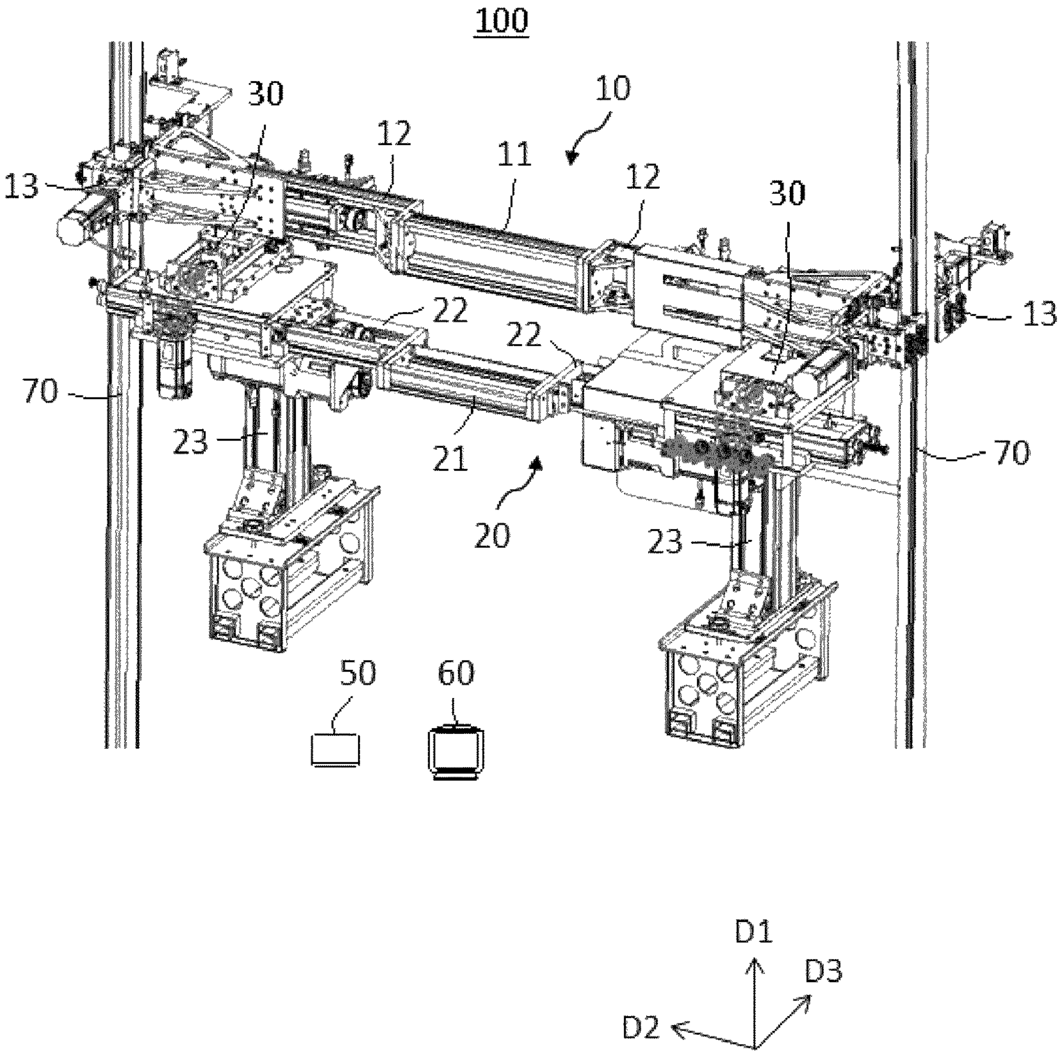
FIG. 1 is a schematic perspective view showing a partial structure of an embodiment of a system for adjustably positioning elevator guide rail according to the present disclosure at an installation site.

FIG. 1 schematically shows a general structural composition of an example of a system for adjustably positioning elevator guide rail according to the present disclosure. Two elevator guide rails 70 (more precisely, they are two elevator guide rail sections constituting the entire elevator guide rail; the length of each section may be the same or different, and the specific length may be for example 1.5 meters, 2 meters, 2.5 meters, 3 meters or other suitable values) located on left and right sides and clamped by the system for adjustably positioning elevator guide rail are simultaneously shown in the figure. During the on-site installation of the elevator guide rails, the system for adjustably positioning elevator guide rail may be arranged on a moving platform for use, so that the positions of the elevator guide rails to be installed and fixed in the elevator hoistway can be automatically adjusted to target positions that meet installation requirements. Subsequently, the positioned elevator guide rails can be installed and fixed in place. Automated operations can be realized for the entire process, thus making it quite efficient, convenient, time-saving and labor-saving.

Regarding the above-mentioned moving platform, it is arranged to be capable of moving up and down in the vertical/perpendicular direction (i.e., the first direction D1 marked in FIG. 1) in the elevator hoistway, so that possible installation areas for the elevator guide rails in the elevator hoistway can be reached. Therefore, installers carried on the moving platform can perform operations related to the elevator guide rails at this place, such as adjustably positioning, installing and fixing. As an alternative embodiment, the elevator car of the elevator system may be directly used as the moving platform, and the installers can carry and arrange the system 100 for adjustably positioning elevator guide rail to a suitable position such as the top of the elevator car for operation. However, it should be understood that the moving platform may be individually designed, manufactured and used according to actual application needs, without being only limited to the use of elevator car.

As shown in FIG. 1, as an example, the system 100 for adjustably positioning elevator guide rail may include an adjustment device 10, a support device 20, a connection device 30, a detection device 40, and a control device 50. These components will be described in detail below respectively.

Figure 2:
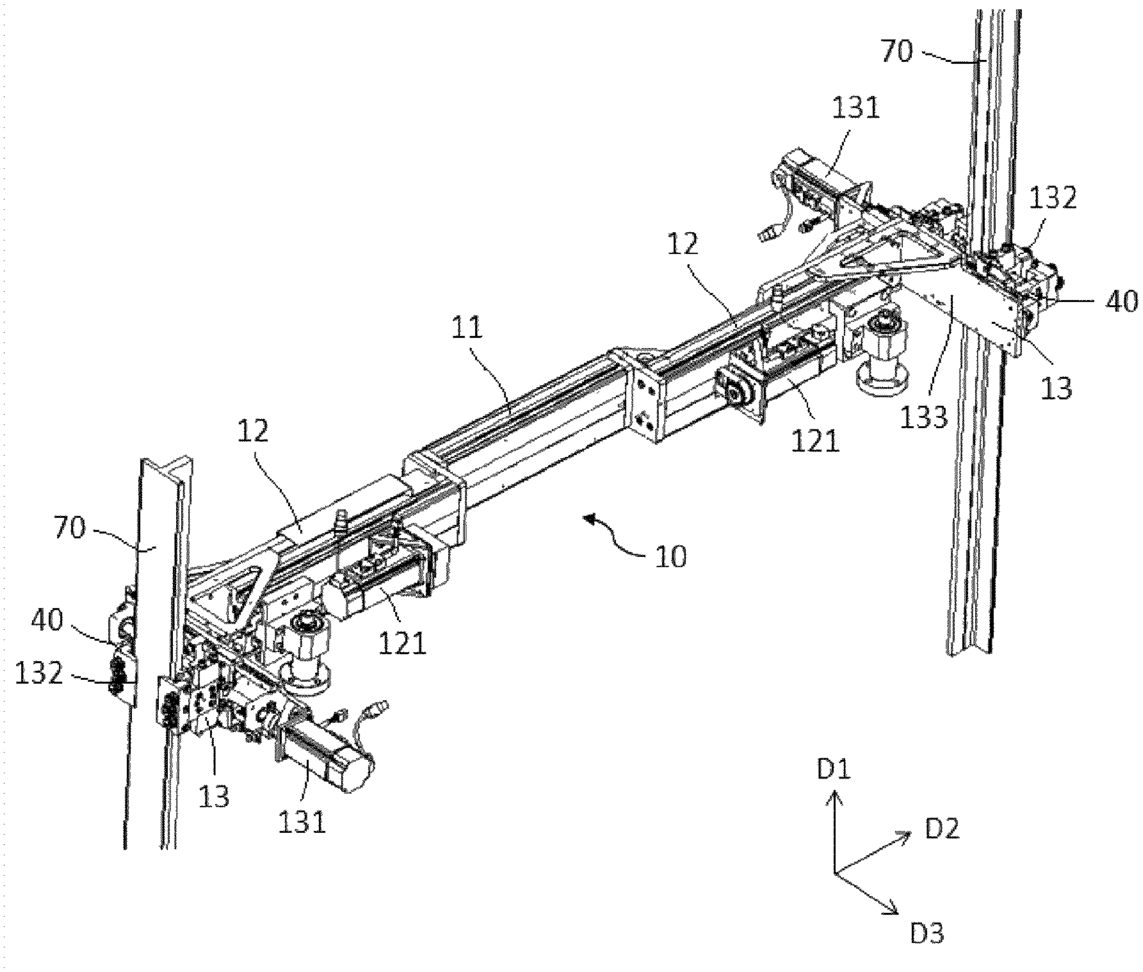
FIG. 2 is a schematic structural perspective view when an adjustment device in the embodiment of the system for adjustably positioning elevator guide rail shown in FIG. 1 clamps two elevator guide rails.
Figure 3:
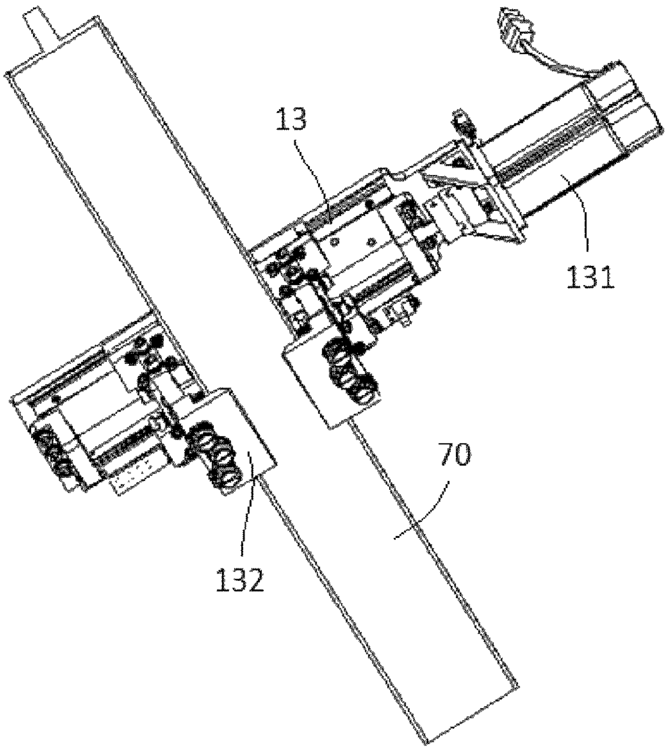
FIG. 3 is a schematic structural perspective view when one clamping portion in the adjustment device shown in FIG. 2 clamps one elevator guide rail.

Referring to FIGS. 1, 2 and 3 in combination, in the system 100 for adjustably positioning elevator guide rail, the adjustment device 10 is arranged on the moving platform through the support device 20 so as to perform operations on the elevator guide rail to be installed, such as clamping, position adjustment and positioning. The connection device 30 may be arranged between the adjustment device 10 and the support device 20 to enable the adjustment device 10 to move in one or more directions relative to the support device 20, such as moving in the vertical/perpendicular direction of the elevator hoistway shown in FIG. 1 (i.e., the first direction D1 marked in FIG. 1) and/or the horizontal width direction of the elevator hoistway (i.e., a third direction D3 marked in FIG. 1). The adjustment device 10 may be provided with a clamping portion 13 and a powering portion. The above-mentioned powering portion can be used to provide power to the clamping portion for performing operations on the elevator guide rail 70 to be installed, such as clamping and moving, so that for example the elevator guide rail that has been clamped by the clamping portion can move in the first direction D1, the second direction D2 (i.e., the horizontal length direction of the elevator hoistway) and/or the third direction D3. As an example, the clamping portion may include a clamping mechanism 132. For example, a manipulator adopting an embracing clamping manner is used to clamp the elevator guide rail more stably, so as to reliably perform a shift operation, etc. The powering portion may include a driving member 131 (such as a motor, a hydraulic device, etc.) configured to drive the clamping mechanism 132. FIG. 3 schematically shows a general situation in which the clamping mechanism 132 and the driving member 131 are used to clamp and move one elevator guide rail.

Referring back to FIGS. 1 and 2, the adjustment device 10 has a body 11 and a moving portion 12, both of which may be made of any suitable material such as metal, plastic, wood and the like separately or in combination. The body 11 can maintain a relatively stationary state when the system 100 for adjustably positioning elevator guide rail is used to adjustably position the elevator guide rail 70, etc. One, two or more moving portions 12 may be flexibly provided according to actual needs, and installed and connected to the body 11. For example, one or more moving portions 12 may be arranged on one side of the body 11, or one or more moving portions 12 may be arranged on both sides of the body 11. In this case, either a symmetrical or an asymmetrical arrangement of the moving portions 12 relative to the body 11 is allowed in the present disclosure.

Any feasible structure such as a screw rod, a screw-and-nut, a gear and the like may be adopted for the moving portions 12, and at least one of the moving portions 12 may be equipped with a powering member such as a motor, a hydraulic device and the like for driving the moving portion 12 to move relative to the body 11 in a direction such as the second direction D2. As shown in FIGS. 1 to 3, the clamping portion of the adjustment device 10 can be installed and connected to the moving portion 12, and the powering portion of the adjustment device 10 may not only include the driving member 131 for providing power to the clamping portion, but also include a driving member 121 for providing power to the moving portion 12. The specific type, number, installation position and the like of the above driving members are all allowed to be flexibly configured according to actual needs. For example, each moving portion 12 may be separately provided with a driving member so as to help improve the operation efficiency, achieve a more flexible movement trajectory, and ensure safety redundancy, etc.

In the system 100 for adjustably positioning elevator guide rail shown in FIG. 1, the adjustment device 10 is arranged on the moving platform through the support device 20 and the connection device 30. The support device 20 is arranged such that when the moving platform runs and stops at the installation area of the elevator guide rail, the support device 20 will be substantially abutted against at least one side of the elevator hoistway along the second direction D2. For example, it is directly abutted against the inner side wall of the elevator hoistway or other support structures, so as to be able to provide support for the subsequent use and operation of the adjustment device 10 and the like. FIG. 1 shows that when two elevator guide rails 70 are installed on two opposite sides of the elevator hoistway on site at the same time, the support device 20 can be abutted against these two sides. Of course, in some situations, such as partial installation or maintenance, in which only one elevator guide rail 70 needs to be installed on one side of the elevator hoistway, it is only required to abut the support device 20 against one of the sides, and the remaining part of the support device 20 on the moving platform can provide additional support.

Figure 4:
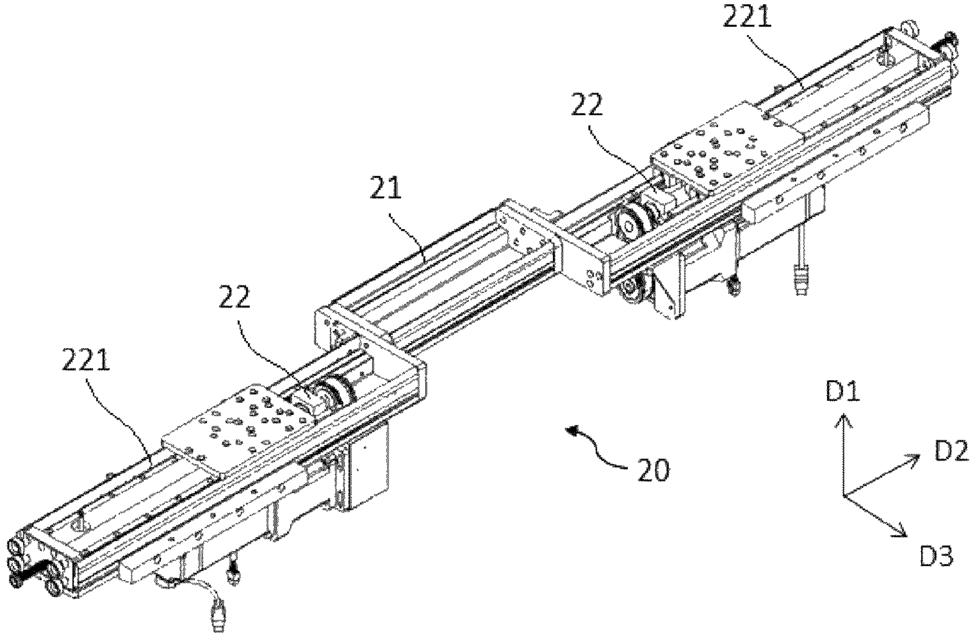
FIG. 4 is a schematic perspective view showing a partial structure of a support device in the embodiment of the system for adjustably positioning elevator guide rail shown in FIG. 1.

As an example, a general structure of the support device 20 is exemplarily shown in FIGS. 1 and 4. The support device 20 may include a body 21, a moving portion 22, and an actuation portion. The body 21 and the moving portion 22 may be both made of any suitable material such as metal, plastic, wood, etc. One, two or more moving portions 22 may be provided according to actual needs, and installed and connected to the body 21. For example, one or more moving portions 22 may be arranged on one side of the body 21, or one or more moving portions 22 may be arranged on both sides of the body 21 respectively. In the present disclosure, either a symmetrical or an asymmetrical arrangement of the moving portions 22 relative to the body 21 is completely allowed.

Any feasible structure such as a screw rod, a screw-and-nut, a gear and the like may be adopted for the moving portions 22, and the above actuation portion can be used to provide power to at least one of the moving portions 22, so as to enable the moving portion 22 to move relative to the body 21 in a direction such as the second direction D2. As such, the length of the support device 20 in the second direction D2 can be adjusted, so that the support device 20 can abut against at least one side of the elevator hoistway. As shown in FIG. 4, optionally, two moving portions 22 may be arranged symmetrically on both sides of the body 21, and the actuation portion of the support device 20 may include driving members 221 (such as motors, hydraulic devices, etc.) respectively installed in the corresponding moving portions 22 to provide power. Of course, in some applications, other ways may also be used to adjust the length of the support device 20 in the second direction D2. For example, one or more gaskets and other elements and components may be additionally arranged between the body 21 and the moving portions 22 according to actual needs to increase the length of the support device 20 in the second direction D2.

Figure 5:
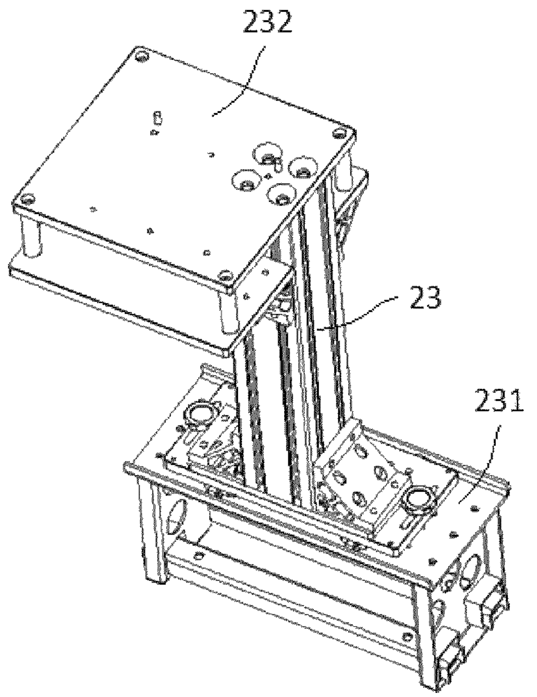
FIG. 5 is a schematic structural perspective view of a bracket in the support device in the embodiment of the system for adjustably positioning elevator guide rail shown in FIG. 1.

As an optional situation, as shown in FIG. 5, the support device 20 may also include one or more brackets 23, that is, the support device 20 is installed on the moving platform through the above brackets 23, and the connection device 30 may also be optionally arranged on the bracket 23, such as being installed and fixed to an upper part 232 of the bracket 23. The specific structure, number, and materials of the brackets 23 may all be set according to requirements on use. For example, in order to facilitate performing operations such as installation and disassembly on the system 100 for adjustably positioning elevator guide rail on the moving platform, an assembly portion 231 with a detachable structure may be provided on the bracket 23, so that the system 100 for adjustably positioning elevator guide rail can be detachably installed on the moving platform through the assembly portion 23. For example, the system 100 for adjustably positioning elevator guide rail can therefore be installed on a top frame of the elevator car very conveniently, quickly and easily.

In the exemplary system 100 for adjustably positioning elevator guide rail, the detection device 40 is arranged to detect current movement characteristics of the clamping portion that has not clamped the elevator guide rail (such as a plate part 133 or other parts on the clamping portion), or detect the current movement characteristics of the clamping portion that has clamped the elevator guide rail (or can also be understood as movement characteristics of the elevator guide rail 70 (or other associated parts in the adjustment device 10) in contact with the clamping portion at this time; since when the clamping portion has clamped the elevator guide rail, the relative positional relationship between them is determined, their respective movement characteristics have the same or similar meanings herein); such movement characteristics may include but are not limited to, for example, position or distance data, movement speed data, movement speed data, etc. The movement characteristics of the clamping portion detected by the detection device 40 will be provided to the control device 50 so that the control device 50 can make judgment analysis and control operations on a difference between an actual position of the elevator guide rail that has been clamped by the clamping portion or is to be clamped by the clamping portion and a target position, etc.

In actual use, the function of the detection device 40 can be realized by providing one or more sensors. For example, one or more position sensors may be equipped in the system 100 for adjustably positioning elevator guide rail, so as to detect the position of the clamping portion that has not or has clamped the elevator guide rail in the first direction D1, the second direction D2 and/or the third direction D3. As an example, the above-mentioned position sensors may be for example arranged on the adjustment device 10 and/or on the elevator guide rail that has been clamped by the clamping portion, and position data detected by the position sensors may include a distance between the clamping portion and a reference in the elevator hoistway (for example, a reference line arranged in the elevator hoistway, such as a plumb line, laser or infrared rays emitted by a laser device or an infrared device, etc.) in the first direction D1, the second direction D2 and/or the third direction D3.

The control device 50 is the system 100 for adjustably positioning elevator guide rail, and it can be connected with the detection device 40 and the adjustment device 10. As to the specific connection method, wired connection (such as cable direct interconnection using any feasible interface such as RS485 and USB), wireless connection (e.g., using any feasible wireless communication protocol such as WIFI and BlueTooth), etc., may be used separately or in combination.

According to the solution of the present disclosure, the control device 50 may be implemented through components such as PLC single-chip microcomputers, industrial computers, electronic modules, etc., and it can be arranged to receive the movement characteristics of the clamping portion that has not or has clamped the elevator guide rail, detected by the detection device 40, and judge whether the clamping portion is already in a desired position at this time according to the received movement characteristics, so that the elevator guide rail that has been clamped or is to be clamped can be positioned and installed in a target position that meets installation requirements; it is then determined whether it is necessary to control the powering portion in the adjustment device 10 to adjust the position of the clamping portion in the first direction D1, the second direction D2 and/or the third direction D3, thereby promoting the elevator guide rail to be finally positioned and installed in the target position. Automated operations are realized for the entire control process without relying on the individual technical levels and working statuses of the installers as in the prior art, thereby significantly improving the installation accuracy and efficiency and greatly saving the cost. It should be noted that the data related to the above target position (for example, according to the relative position relationship among the target position, the clamping portion and the clamped elevator guide rail, conversion processing can be performed to obtain an expected position where the clamping portion needs to be adjusted in place) can be for example pre-stored in the control device 50 or other places, or input or modification operations may also be performed at the installation site, which will be discussed later.

In some alternative embodiments, the control device 50 may be configured to: compare detected data of the distance (for example, in the second direction D2 and the third direction D3) between the clamping portion that has not or has clamped the elevator guide rail and the reference (such as a reference line suspended in the elevator hoistway) with the corresponding distance between the expected target position and the reference, so as to obtain a corresponding distance difference; then the powering portion is controlled (for example, the driving member 131 for the clamping portion and the driving member 121 for the moving portion 12 are directly controlled) to adjustably position the clamping portion in place; for example, the above distance difference can be controlled to be within an allowable error range preset according to the installation requirements (such as 0.5 mm, 1 mm, etc.).

It should also be noted that the system 100 for adjustably positioning elevator guide rail may also include a display device 60, which may be optionally integrated with the control device 50 and arranged on the moving platform; for example, they may be installed on one side of the upper part 232 of the bracket 23. The display device 60 can be used to intuitively display the data related to the movement characteristics detected by the detection device 40, and/or the display device 60 can provide an interface for human-machine interaction, so that installers and the like can perform various possible human-computer interaction operations such as inputting or modifying data related to the target position, thus allowing for the possibility of timely, flexible and effective implementation at the installation site. It should be understood that since the present disclosure allows the control device 50, the detection device 40 and/or the adjustment device 10 to be communicatively connected in a wireless manner, the control device 50 and/or the display device 60 may be mobile terminals, such as handheld controllers with a display screen, or smart phones installed with corresponding control APPs, etc., which make it very convenient for on-site personnel to operate.

With reference to the embodiments shown in FIGS. 1 to 5, the general structural composition, working principle and technical advantages and the like of the system for adjustably positioning elevator guide rail according to the present disclosure have been described in detail above. Without departing from the spirit of the present disclosure, those skilled in the art can make various possible flexible designs, changes and adjustments based on the teachings of these exemplary contents and actual application conditions.

For example, although the adjustment device 10, the support device 20 and the connection device 30 are simultaneously provided in the above system 100 for adjustably positioning elevator guide rail, in some alternative embodiments according to the present disclosure, at least one of the support device 20 and the connection device 30 may be omitted. For example, none of them is provided, and instead, the body 11 of the adjustment device 10 can be directly installed on the moving platform.

For another example, although corresponding powering members can be equipped to prompt the clamping portion itself to move in the first direction D1, the second direction D2 and/or the third direction D3 or prompt the clamping portion to drive the clamped elevator guide rail to move in the first direction D1, the second direction D2 and/or the third direction D3, the movement of the clamping portion in one or some directions is also allowed to be realized for example through the movement of the adjustment device 10 and the like in the corresponding direction. For example, the movement of the moving portion 22 in the second direction D2 can be realized through the above-mentioned driving member 221 in the adjustment device 10, and thus the movement of the clamping portion connected to the moving portion 22 and the elevator guide rail clamped by the clamping portion (in a case where the elevator guide rail has been clamped) in the second direction D2 can also be realized. Therefore, at this time, the clamping portion can be arranged to move only in the third direction D3 through the powering member connected to it. It should be understood that in the system for adjustably positioning elevator guide rail according to the present disclosure, it is allowed to flexibly realize the control of the movement of the elevator guide rail in the first direction D1, the second direction D2 and/or the third direction D3 through a combination of the respective movements of various components in one or some directions, which can finally locate the elevator guide rail in the target position that meets the installation requirements accurately and efficiently.

The system for adjustably positioning elevator guide rail according to the present disclosure has obvious technical advantages such as those described above, so it is very suitable for being promoted and applied to the on-site installation project of elevator guide rails to promote the solution of the drawbacks and problems existing in the prior art including those described above.

Figure 6:
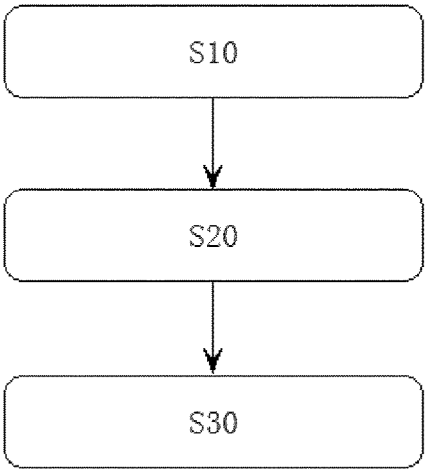
FIG. 6 is a schematic flowchart of an example of a method for installing and adjusting elevator guide rail.

The present disclosure also provides a method for installing and adjusting elevator guide rail. As an example, as shown in FIG. 6, an example of the method for installing and adjusting elevator guide rail may include the following steps:

In step S10, the system for adjustably positioning elevator guide rail according to the present disclosure can be arranged on the moving platform, and the moving platform can be made run to the installation area of the elevator guide rail. As mentioned above, the moving platform may optionally be the elevator car; for example, the installers may carry the system for adjustably positioning elevator guide rail and arrange it on the top frame of the elevator car for operation.

During the installation of the elevator guide rail, the adjustment device in the system for adjustably positioning elevator guide rail can be used to clamp the elevator guide rail to be installed at the target position. This can be done after the clamping portion in the adjustment device is adjusted in place. It is also possible to use the clamping portion to clamp the elevator guide rail and then adjust them in place together. During actual installation, the elevator guide rails are usually divided into sections and installed on the side of the elevator hoistway one by one. In some installation situations, mechanical equipment such as a hoist can be used to transport the elevator guide rails to be installed to the corresponding installation areas.

In step S20, the detection device in the system for adjustably positioning elevator guide rail can be used to detect the current movement characteristics of the clamping portion of the adjustment device. It should be understood that the detected clamping portion may have not clamped the elevator guide rail or may have clamped the elevator guide rail at this time. The technical contents such as the movement characteristics, the structure and operation of the clamping portion and related parts have been described in detail above, so reference may be directly made to the specific description of the corresponding parts, and a repeated description will be omitted herein.

In step S30, the position of the clamping portion is adjusted in place by controlling the powering portion of the adjustment device using the control device according to the movement characteristics detected by the detection device so that the elevator guide rail that has been clamped by the clamping portion or will be clamped by the clamping portion can be positioned and installed at the target position. In this way, the installers can use connectors such as bolts or other feasible connection means to install the positioned elevator guide rail in place, and then the moving platform is made run to the installation area of the next section of elevator guide rail. Then, the above corresponding operation steps are repeated. In this way, the installation work of the elevator guide rail can be completed.

As a further example, as mentioned above, since in some embodiments of the system according to the present disclosure, a support device may be provided in the system for adjustably positioning elevator guide rail. In this case, before the detection device in the system for adjustably positioning elevator guide rail is used for detection, the support device is abutted against at least one side of the elevator hoistway along the second direction D2 at the installation area of the elevator guide rail, so that the support device can provide a relatively more favorable support stability for the adjustment device, etc., which is helpful for promoting a further improvement of the accuracy and efficiency of the adjustment, positioning and installation operations, etc.

The system and method for adjustably positioning elevator guide rail according to the present disclosure have been elaborated above in detail by way of example only. These examples are merely used to illustrate the principles and embodiments of the present disclosure, rather than limiting the present disclosure. Various modifications and improvements can be made by those skilled in the art without departing from the spirit and scope of the present disclosure. Therefore, all equivalent technical solutions should fall within the scope of the present disclosure and be defined by the claims of the present disclosure.

What is claimed:

1. A system for adjustably positioning elevator guide rail, comprising:

an adjustment device configured to be arranged on a moving platform and having a clamping portion and a powering portion, the clamping portion being arranged to be capable of clamping an elevator guide rail to be installed through a power output from the powering portion, the powering portion configured to move the clamping portion in a second direction and a third direction, and the moving platform being capable of moving up and down in a first direction;

a detection device arranged to detect current movement characteristics of the clamping portion when the elevator guide rail is not clamped or has been clamped by the clamping portion;

a control device connected to the detection device and the adjustment device, and arranged to adjust the position of the clamping portion in place by controlling the powering portion according to the movement characteristics so that the clamped elevator guide rail can be positioned and installed at a target position;

a support device, which is installed on the moving platform and connected to the adjustment device so that the adjustment device is arranged on the moving platform, and which is arranged to abut against at least one side of an elevator hoistway along the second direction at an installation area of the elevator guide rail;

a connection device arranged between the support device and the adjustment device to enable the adjustment device to move relative to the support device in the first direction and the third direction, wherein the adjustment device is located vertically above the support device.

2. The system for adjustably positioning elevator guide rail according to claim 1, wherein the support device comprises at least one bracket, and the support device is installed on the moving platform through the bracket.

3. The system for adjustably positioning elevator guide rail according to claim 2, wherein the bracket has an assembly portion arranged to be detachably installed on the moving platform.

4. The system for adjustably positioning elevator guide rail according to claim 1, wherein the support device comprises:

a body;

one or more moving portions connected to the body and arranged on at least one side of the body; and an actuation portion arranged to enable at least a part of the moving portions to move relative to the body in the second direction, so as to adjust a length of the support device in the second direction and make the support device abut against at least one side of the elevator hoistway.

5. The system for adjustably positioning elevator guide rail according to claim 4, wherein the support device comprises two moving portions, which are symmetrically arranged on both sides of the body.

6. The system for adjustably positioning elevator guide rail according to claim 4, wherein the actuation portion comprises a driving member installed on the moving portions to provide power to the moving portions.

7. The system for adjustably positioning elevator guide rail according to claim 1, wherein the support device and the adjustment device are both arranged substantially along the second direction.

8. The system for adjustably positioning elevator guide rail according to claim 1, wherein the adjustment device comprises a body and one or more moving portions, the moving portions are connected to the body and arranged on at least one side of the body, and the clamping portion is connected to the moving portions.

9. The system for adjustably positioning elevator guide rail according to claim 8, wherein the adjustment device comprises two moving portions, which are symmetrically arranged on both sides of the body.

10. The system for adjustably positioning elevator guide rail according to claim 8, wherein the powering portion comprises a first driving member installed on the moving portions to provide power to the moving portions, and a second driving member installed on the clamping portion to provide power to the clamping portion.

11. The system for adjustably positioning elevator guide rail according to claim 1, wherein the detection device comprises at least one position sensor, and the movement characteristics comprise positions of the clamping portion in the first direction, the second direction and/or the third direction detected by the position sensor.

12. The system for adjustably positioning elevator guide rail according to claim 11, wherein the position sensor is arranged on the adjustment device and/or the clamped elevator guide rail, data of the positions comprises distances between the clamping portion and a reference located in an elevator hoistway in the first direction, the second direction and/or the third direction, and the control device is arranged to control the powering portion to adjust the position of the clamping portion in place by comparing the distances with corresponding distances between the detected target position and the reference in the first direction, the second direction and/or the third direction.

13. The system for adjustably positioning elevator guide rail according to claim 12, wherein the reference comprises a reference line arranged in the elevator hoistway.

14. The system for adjustably positioning elevator guide rail according to claim 1, wherein the control device is connected to the detection device and/or the adjustment device in a wireless manner, and the control device comprises a mobile terminal.

15. The system for adjustably positioning elevator guide rail according to claim 1, wherein the system for adjustably positioning elevator guide rail further comprises a display device connected to the control device and arranged to display data related to the movement characteristics and/or provide human-computer interaction operations which comprise inputting or modifying data related to the target position.

16. The system for adjustably positioning elevator guide rail according to claim 1, wherein the moving platform is an elevator car.

17. A method for installing and adjusting elevator guide rail, comprising the steps of:

arranging the system for adjustably positioning elevator guide rail according to claim 1 on the moving platform, and making the moving platform run to an installation area of the elevator guide rail;

using the detection device to detect current movement characteristics of the clamping portion when the elevator guide rail is not clamped or has been clamped by the clamping portion; and adjusting the position of the clamping portion in place by controlling the powering portion of the adjustment device using the control device according to the detected movement characteristics so that the clamped elevator guide rail can be positioned and installed at a target position.

18. The method for adjustably positioning elevator guide rail according to claim 17, further comprising the step of abutting the support device against at least one side of the elevator hoistway along the second direction at the installation area when the system for adjustably positioning elevator guide rail is provided with the support device, before using the detection device for detection.

* * * * *